(12) United States Patent
Tang et al.

(10) Patent No.: US 9,071,550 B2
(45) Date of Patent: Jun. 30, 2015

(54) FRAMEWORK AND METHOD FOR MONITORING PERFORMANCE OF VIRTUALIZED SYSTEMS BASED ON HARDWARE BASE TOOL

(75) Inventors: Changbin Tang, Shanghai (CN); Penghao Cai, Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 0 days.

(21) Appl. No.: 14/122,047

(22) PCT Filed: May 10, 2012

(86) PCT No.: PCT/CN2012/075274
§ 371 (c)(1),
(2), (4) Date: Mar. 7, 2014

(87) PCT Pub. No.: WO2012/163217
PCT Pub. Date: Dec. 6, 2012

(65) Prior Publication Data
US 2014/0201357 A1 Jul. 17, 2014

(30) Foreign Application Priority Data

May 27, 2011 (CN) .......................... 2011 1 0141642

(51) Int. Cl.
*G06F 15/173* (2006.01)
*H04L 12/26* (2006.01)
*G06F 11/34* (2006.01)

(52) U.S. Cl.
CPC ............ *H04L 43/50* (2013.01); *G06F 11/3466* (2013.01); *G06F 2201/815* (2013.01)

(58) Field of Classification Search
CPC .......... H04L 43/00; H04L 43/08; H04L 43/50
USPC ......................................................... 709/224
See application file for complete search history.

(56) References Cited

U.S. PATENT DOCUMENTS

| 2007/0192641 A1* | 8/2007 | Nagendra et al. ............. 713/320 |
| 2009/0007134 A1 | 1/2009 | Chiu et al. |
| 2010/0235836 A1* | 9/2010 | Bratanov ......................... 718/1 |

FOREIGN PATENT DOCUMENTS

| CN | 1613214 | 5/2005 |
| CN | 102314391 | 1/2012 |

* cited by examiner

*Primary Examiner* — Tamara T Kyle
(74) *Attorney, Agent, or Firm* — Occhiuti & Rohlicek LLP

(57) ABSTRACT

The disclosed invention involves a framework and method based on hardware base tool to monitor the performance of virtualized systems, wherein the said framework comprises at least one master host, and each of the said master host comprises user space components, guest space components, kernel space components and hardware. The said user space components comprise policy manager, workload mediator, monitor library, and host performance monitor. The said host performance monitor is connected to workload mediator, and host performance monitor comprises user space monitor and kernel space monitor. The disclosed invention applies PMU or the similar tools to monitor the performance of virtualized systems. The performance monitoring of the disclosed invention is to monitor CPU, memory, cache, IO, network, processes, etc. of the host of virtualized systems. Meanwhile, the method based on hardware to monitor performance in this disclosed invention resolves the problem to acquire performance data for virtualized systems.

14 Claims, 13 Drawing Sheets

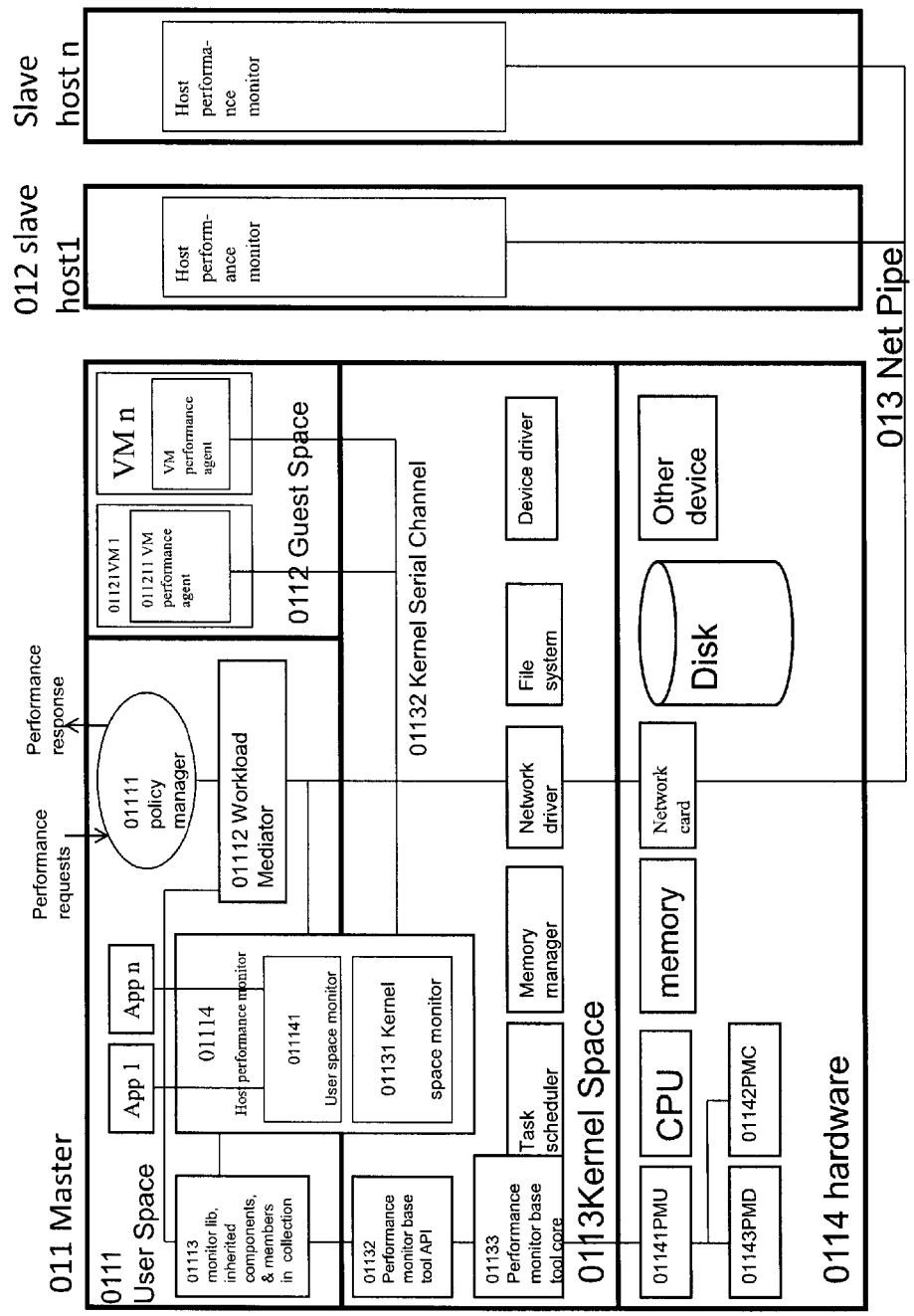

FRAMEWORK AND METHOD FOR MONITORING PERFORMANCE OF VIRTUALIZED SYSTEMS BASED ON HARDWARE BASE TOOL

CROSS REFERENCE TO RELATED APPLICATION

This application is the national phase under 35 USC 371 of international application no. PCT/CN2012/075274, filed May 10, 2012, which claims the benefit of the priority date of Chinese application no. 201110141642.X, filed May 27, 2011. The contents of the aforementioned applications are incorporated herein in their entirety.

FIELD OF THE INVENTION

The present invention discloses a framework and method for monitoring performance of virtualized systems based on hardware base tool.

BACKGROUND

In the past, the performance of computer software system, including operating system (OS) and its applications, has been a concern of software vendors and their customers, since system performance relates directly to the service quality and success of software product sales. In general there are two angles to view the issue of performance:

The first angle views the "consequence" of application software, or the "user experience" as performance. For example, software code is inserted into applications to measure the "response time" from the return key to the response appearing on computer screen. The performance measurement code may be combined with application functions to form a complicated Performance Monitor, such as Couture's patent US20080235075 "Enterprise application performance monitors".

The second angle views the "cause" that impacts the performance of running software. The impacting root cause is, of course, the hardware resources such as CPU, memory, IO and network. In the past there is no way to measure performance from hardware, hence the second best way can only utilize the OS performance commands to measure performance of the resources like threads, processes, etc. Lately, new hardware monitoring base tool emerges, such as x86-based hardware register capable of monitoring CPU, called Performance Monitor Unit (PMU). There are quite a few PMU patents: e.g. Davidson's U.S. Pat. No. 6,718,403 "Hierarchical selection of direct and indirect counting events in a PMU", Mericas's U.S. Pat. No. 7,500,138 "Simplified event selection for a PMU" and Mericas's US20060167658 "Method and product of PMU for sampling all performance events generated by a processor". There are also non-PMU patents that are hardware and performance monitoring based, such as Fowles's US20060277395 "Processor performance monitoring"; Kosche's US20080177756 "Method and apparatus for synthesizing hardware counters from performance sampling", and Hunter's US20080294944 "Processor bus for performance monitoring with digests".

Two kinds of registers help monitoring performance: performance control register (PMC) and performance data register (PMD). PMC monitors CPU at regular time intervals, and saves monitored data into PMD. PMC is event-based or time-based to consolidate the collected event information and report the monitoring results to higher software layers. Advantages of hardware monitoring are: (1) in the past, certain software-based monitors require to continuously change the source code of the monitored software to reach its goal, e.g. optimizing a Java virtual machine routine. On the contrary, hardware-based monitoring requires no source code. (2) The performance of monitored software is not affected by monitoring activities. (3) Very low-level kernel code can be monitored. Most importantly, (4) Capability to monitor cache is nowhere found in any other monitoring means. One example is TLB miss and hit, where TLB stands for "translation look-aside buffer", the CPU cache hardware for memory management to improve the speed of virtual H physical address translation. TLB takes virtual address as search keyword. The search result is physical address: if the needed address can be found in TLB, it is called TLB hit. Otherwise, it is called TLB miss. Frequent TLB misses indicate the performance of resource is degraded. The details of PMU are described in the document written by Eranian, Hewlett Packard Company, "The perfmon2 interface specification".

There are not very many PMU applications. Moreover, there is no existing method to utilize PMU and combine OS performance commands to measure the performance of "virtualized systems". Here is the explanation of virtualized systems:

The technology of OS virtualization leads to the result of a physical machine is capable of running multiple "guest" OSs (or Virtual Machine, briefly VM, or simply "guest"). The VMs run on VMM (virtual machine monitor, or hypervisor), and Hypervisor runs directly on physical machine. In most cases, the monitored physical machines are servers (or host) in the data center. There are different OS virtualization techniques, such as para-virtualization or full virtualization. In general, a host has at least two spaces to be monitored: one is the space where VMs are running, called (1) guest space; the other is the space where a hypervisor is running, called (2) kernel space. Some virtualization technique, such as Linux KVM, keeps the use of the original (3) user space. The above explains the internals of a host. Multiple such hosts form a cluster, with a lead host called master, and several subordinate hosts called slaves. Multiple clusters become a network system, being distributed, centralized, or mixed. This explains "virtualized systems" of the disclosed invention, a network system covering large geographical areas.

Tang's patent US20110296411 "Kernel bus system to build Virtual Machine Monitor and the performance service framework & Method therefore" describes how virtualized systems analyze performance data, perform VM migration, and mediate workload. The patent however does not describe how virtualized systems acquire performance data.

SUMMARY

In order to resolve the existing technical issue, the objective of the disclosed invention is to provide a framework and method of monitoring performance of virtualized systems based on hardware base tool, to apply PMU (or similar tool) to the performance monitoring of virtualized systems. The said method monitors CPU, memory, cache, IO, network, process, etc. of multiple hosts in virtualized systems. Meanwhile, the hardware-based monitoring method of the disclosed invention resolves the issue of how to acquire performance data for virtualized systems.

One of the disclosed inventions involves the said framework and method to monitor the performance of virtualized systems based on hardware base tool, comprise at least one master host, each of the said master host includes user space components, guest space components, and kernel space components, wherein The said user space components comprise connected policy manager, workload mediator, monitoring library, and host performance monitor. The host performance monitor is further connected with workload mediator, and the host performance monitor comprises user space monitor and kernel space monitor;

The said guest space components comprise at least one virtual machine (VM) connected with said host performance monitor via kernel serial channel;

The said kernel space components comprise performance monitor base tool application interface (API) and performance monitoring base tool core code module, connected with said monitor library, as well as task scheduler, memory management unit, network driver, file system and device driver, wherein the said network driver is connected with said workload mediator;

The said hardware supports peripheral performance monitoring base tool, wherein the hardware comprises PMU connected with said performance monitoring base tool core code module, PMD and PMC respectively connected with PMU, and CPU, memory, hard disk and network card wherein the said network card is connected with network driver.

The said framework to monitor virtualized systems based on hardware base tool comprises at least one slave host. Each of the said master host is connected with the said at least one slave host via net pipe to form a cluster. Multiple said master hosts and their respective slave hosts form multiple clusters, and said clusters communicate with each other via centralized, distributed or mixed network architecture. The said slave host comprises said host performance monitor wherein the host performance monitor of slave host is connected to the network card of said master host.

The second disclosed invention involves the said method to monitor performance of the virtualized systems based on hardware base tool, comprising:

Firstly, administrators via graphical interface, or user applications via said performance monitor APIs, make performance mediating requests to said policy manager;

Secondly, when said policy manager interprets the said performance mediating requests, it instructs the said workload mediator making request to said master host performance monitor, asking the monitor to report individual slave resource performance conditions via net pipe;

Finally, said policy manager reports overall performance condition to said administrators or said user applications.

Because of the above said technical solution, the disclosed invention is capable of monitoring performance of at least one cluster, wherein the cluster comprises at least one host and the host comprises at least one virtual machine. Therefore, the disclosed invention is also capable of monitoring the performance of hosts. The disclosed invention provides for enterprises and cloud service providers a framework and method to monitor the performance of virtualized systems. The disclosed invention is not about the PMU hardware itself. Rather, it uses a method based on hardware base tool to monitor, calls the APIs of the tool to realize the method, and builds a software performance monitor. System administrators may also interact with the interface provided by the monitor, e.g. an application to adjust virtual and physical resources may call the said monitor interface to obtain the rough ideas of idle/busy situations of the entire clusters, and proceed to adjust these resources.

BRIEF DESCRIPTION OF THE DRAWINGS

FIG. 1a is the architecture block diagram of the framework to monitor performance of virtualized systems based on hardware base tool;

DETAILED DESCRIPTION

Figure 1B:
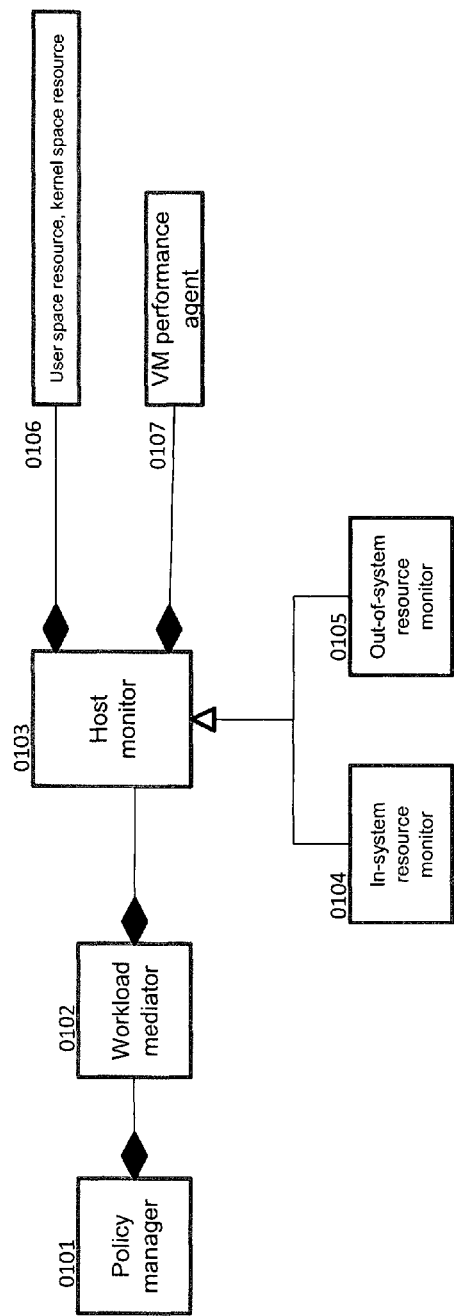
FIG. 1b is the upper layer class diagram of the framework to monitor performance of virtualized systems based on hardware base tool.

The followings are detailed description of the preferred embodiments combining with their drawings.

One of the embodiments comprises multiple clusters, with each cluster comprising multiple hosts, and each host multiple virtual machines. Between clusters there may be centralized, distributed or mixed communications. Between hosts there is net-pipe (e.g. TCP/IP) communication amongst a leading master host, and several subordinate slave hosts. Between host and its virtual machine there is virtual serial port as connection pipe. The serial port pipe means that virtual machine takes this "pipe (which is really just a guest OS system call)" as a virtual serial port. In kernel space, the system call running via hypervisor delivers data to the serial port. The delivering speed is fast enough to avoid slow external network communication.

Refer to FIG. 1a, which shows a block diagram of an embodiment as one of the disclosed invention. The framework of this disclosed invention comprises at least one master host 11 and at least one slave host 12, each master 11 connecting with at least one slave host 12 via net pipe 13 to form a cluster. Multiple masters 11 and their respective salves 12 form multiple clusters which communicate to each other using centralized, distributed or mixed network architecture.

In other words, although servers of this embodiment have master-slave and clustering relationship, the practical architecture may be a centralized or distributed server federation, meaning that master host 11 may control at least one local (distributed federation) or global (centralized federation) slave 12.

Each master host 11 comprises user space components 111, guest space components 112, kernel space components 113, and hardware 114, wherein, User space components 111 comprise connected policy manager 1111, workload mediator 1112, monitor library 1113, and host performance monitor 1114, with host performance monitor 1114 connecting to workload mediator 1112. The host performance monitor 1114 comprises user space monitor 11141 and kernel space monitor 11142 running inside of kernel space. The host performance monitor 1114 also resides at other hosts of the virtualized systems, e.g. at slave 12;

Guest space components 112 comprise at least one virtual machine 个 1121 which connects to host performance monitor 1114 via kernel serial pipe 1131, meaning that there is at least one virtual machine running on top of the hypervisor. Virtual machine 1121 comprises VM performance agent 11211 which collects the performance data of VM resources;

Kernel space components 113 comprise a performance monitor base tool API 1132 connected with monitor library 1113, the performance monitor base tool core code module 1133, as well as other kernel components like task scheduler 1134, memory management unit 1135, network driver 1136, file system 1137, and device driver 1138, wherein the network driver 1136 is connected with workload media 1112. Some OS virtualization technique like Xen modifies the "other kernel components" as part of Hypervisor, while Linux KVM technique puts these components outside of Hypervisor;

Hardware 114 supports peripheral performance monitoring base tool. Hardware 114 comprises PMU 1141 connected with performance monitoring base tool core code module 1133, the PMD 1143 and PMC 1142 connected respectively with PMU 1141, and CPU 1144, memory 1145, network card 1146, hard disk 1147, and other devices 1148 wherein network card 1146 is connected to network driver 1136;

Slave host 12 comprises host performance monitor 1114 and VM performance agent (not shown in the Fig.), etc., wherein the host performance monitor 1114 is connected with network card 1146.

Following the descriptions of the above framework to monitor performance of virtualized system based on hardware base tool, we proceed to describe the second part of the disclosed invention, i.e. the method to monitor performance of virtualized system based on hardware base tool. The said method comprises the following steps:

Firstly, administrators via graphical interface or user applications via performance monitor API 1132 make request to policy manager 1111 to mediate performance;

Secondly, after policy manager 1111 interprets the request of performance mediation, it instructs workload mediator 1112 to make request to host performance monitor 1114 of master host 11 via net pipe 13 to report resource performance condition for each of its slave 12;

Lastly, policy manager 1111 reports entire system performance conditions to user applications or administrators.

The technical details of the above said policy manager 1111 and workload mediator 1112 has been revealed in Tang's patent US20110296411 "Kernel bus system to build Virtual Machine Monitor and the performance service framework & Method therefore". However, the disclosed invention here details the two components in the following embodiments from a viewpoint based on monitor base tool PMU.

Specifically, the requests or enquiries regarding performance come from user via policy manager 1111, and enter into virtual systems. There are three types of requests:

(1) Most monitoring data are about the idle/busy conditions of resources, or monitoring data for resources like CPU, memory, IO, network, etc. The data can be acquired from "OS performance commands". However, it is the "performance monitoring base tool" that controls when to start and end the monitoring process, and how to setup the monitoring events.

(2) Other monitoring data have to do with resource health condition, the data of cache and TLB miss, or the information regarding work-stopping of certain resources. Such data cannot be acquired from OS system performance commands, and can only be relying on performance monitoring base tool (such as PMU). In other words, in such situation performance monitoring base tool is used alone.

(3) Mix idle/busy condition and health condition. For example, (3) process monitoring relies only on performance monitoring base tool (such as PMU), but the acquired monitoring data mix idle/busy condition and health condition.

Therefore, in order to realize the above functions, the disclosed invention has two features: (1) capable of monitoring VM performance; (2) applying hardware-based performance monitoring base tool (although the embodiments uses PMU as base tool, none-PMU tool can be used as well), including sampling methods based on time or events.

The above two features may be described from an architecture viewpoint, namely the disclosed invention comprises two layers of performance monitoring architecture: top layer and bottom layer.

Here is the description of top layer architecture: top layer is a hierarchical object-oriented class diagram covering entire network topology of the "virtualized systems". Policy manager is the "ancestor", inherited by workload mediator, which is in turn inherited by host performance monitor. VM performance monitor and host performance monitor eventually are inherited by system internal and external resource monitors. system internal and external resource monitors use OS system performance commands to catch data, and employ performance monitoring base tool to monitor based on time and events (Notice that VM performance data are acquired by combining monitoring data from internal and external parts of virtualized systems. Therefore, it is an important feature of the disclosed invention to be capable of monitoring internal and external system resources. In other words, the virtualized systems of the disclosed invention include system internal resource monitor and system external resource monitor).

Refer to FIG. 1*b* which shows top layer architecture class diagram. In other words, it is an object-oriented engineering class diagram for policy manager 1111 and its inherited components. Specifically, policy 1111, workload mediator 1112 and the host performance monitor 1114 in the master host form the top-layer architecture, wherein:

The classes of top layer is policy manager 1111, where each policy manager 1111 is the set of at least one workload mediator 1112 (expressed by ♦—, where the end near ♦ is a set, and other end is the member of that set);

Each workload mediator 1112 is a set of at least one host performance monitor 1114;

Each host performance monitor 1114 is a set comprising at least one resource monitor 0106 (e.g. user space monitor 11141 and kernel space monitor 11142), and VM performance agent 11211;

The most important class is host performance monitor 1114. It is the base class for all user space monitor 11141, kernel space monitor 11142, and VM performance agent 11211. It is also inherited respectively by system internal resource monitor 104, and system external resource monitor 105 (expressed by ◁——, where the end near ◁ is inherited class, the other end is inheriting class).

Therefore, host performance monitor 1114 can be a set, and comprises at least one member of the set. Moreover, host performance monitor 1114 is also an abstract concept of monitoring function, where all those inherited classes such as system internal resource monitor 104, system external resource monitor 105, more or less possess the same function as the host performance monitor. The member in the set of host performance monitor 1114, also possess the function of internal and external monitoring.

Figure 2:
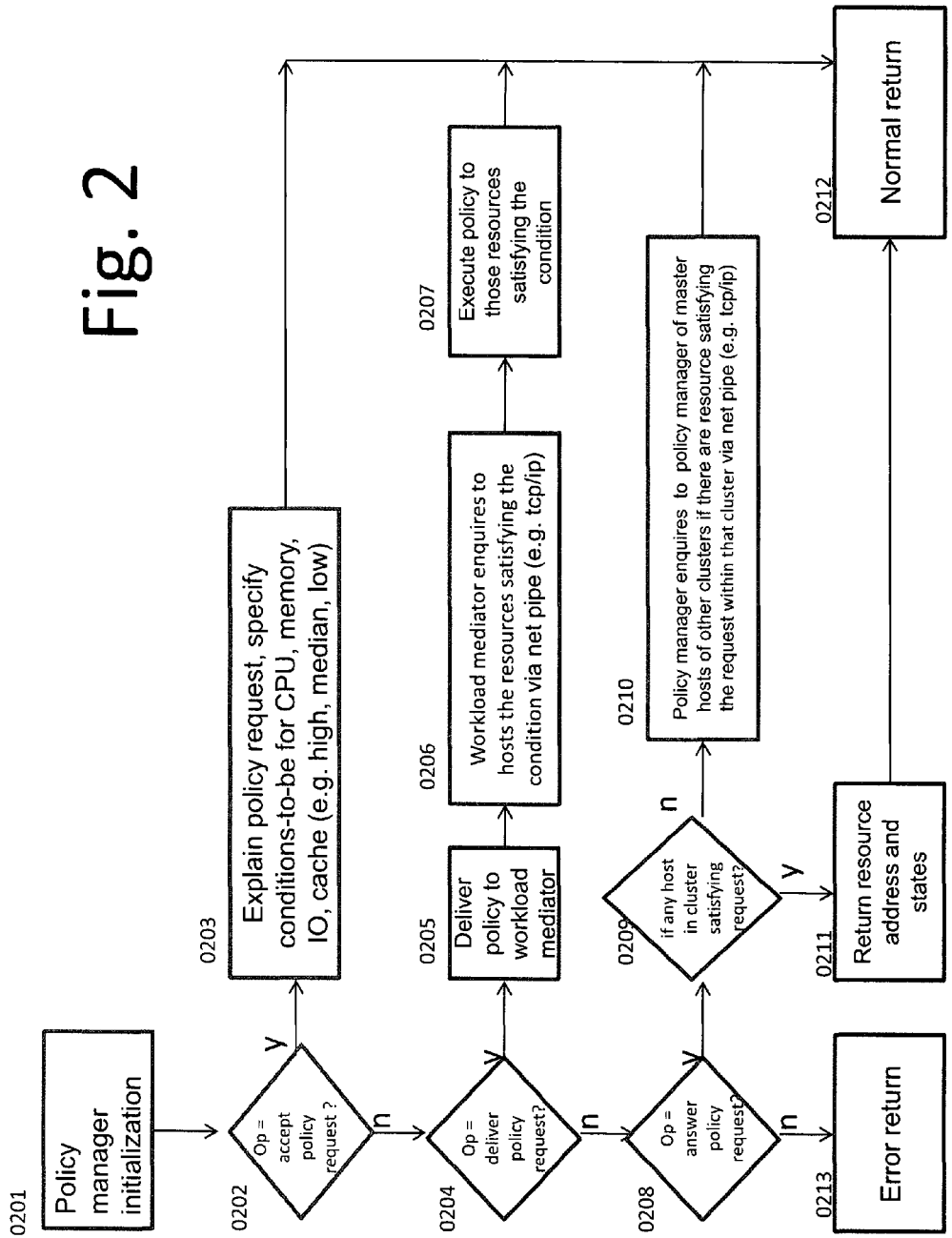
FIG. 2 is the flowchart of the policy manager in the framework to monitor performance of virtualized systems based on hardware base tool.

Refer to FIG. 2, which shows the flowchart of policy manager 1111.

In summary, policy manager is used to interpret user policy request, specifying the performance boundary value of CPU, memory, IO, network, and cache. It divides the user policy requests into three levels: high, median, and low. It then provides event configuration information, delivers policy to workload mediator 1112, and returns resource address and conditions after the data of virtualized systems are collected. If the master host 11 of a cluster is unable to satisfy the user policy request, policy manager 1111 simultaneously or in the order of priority, enquires policy manager 1111 of the master host of other clusters according the policy of enquiring cluster in order to satisfy the user policy request. In other words, if local cluster has no resource to satisfy the policy request, policy manager 1111 enquires resource satisfying the request to the policy manager 1111 of the master host 11 of other clusters via net pipe 13 (e.g. TCP/IP). As for the order of enquiries, it can be sequential or simultaneous, depending on the rules of this kind in the policy base. The rules may involve cluster management method, e.g. the method for centralized clusters, distributed clusters, or mixed clusters.

The flow of policy manager 1111 is as follows:

Step 201, policy manager 1111 initializes itself;

Step 202, determine if operation is to accept policy request. If yes, proceed to step 203. Otherwise, proceed to step 204;

Step 203, interpret policy request. Specify the boundary performance value of CPU, memory, IO, network, and cache (e.g. high, median or low). Proceed to step 212;

Step 204, determine if the operation is to deliver policy request. If yes, proceed to step 205. Otherwise, proceed to step 208;

Step 205, deliver policy to workload mediator 1112. Proceed to step 206;

Step 206, workload mediator 1112 enquires resources satisfying the request to the host via net pipe 13 (e.g. tcp/ip). Proceed to step 207;

Step 207; execute policy to resource satisfying request. Proceed n to step 212;

Step 208, determine if operation is to respond to policy request. If yes, proceed to step 209. Otherwise proceed to step 213;

Step 209, determine if any host in the cluster satisfies the request from the reports of workload mediator 1112. If yes, proceed to step 211. Otherwise proceed to step 210;

Step 210, policy manager 1111 enquiries to the policy manager 1111 of the master host 11 of other cluster, if there is resource satisfying request in that cluster via net pipe 13 (e.g. tcp/ip). Proceed to step 212;

Step 211, return resource address and conditions. Proceed to step 212;

Step 212, normal return;

Step 213, error return.

Figure 3A:
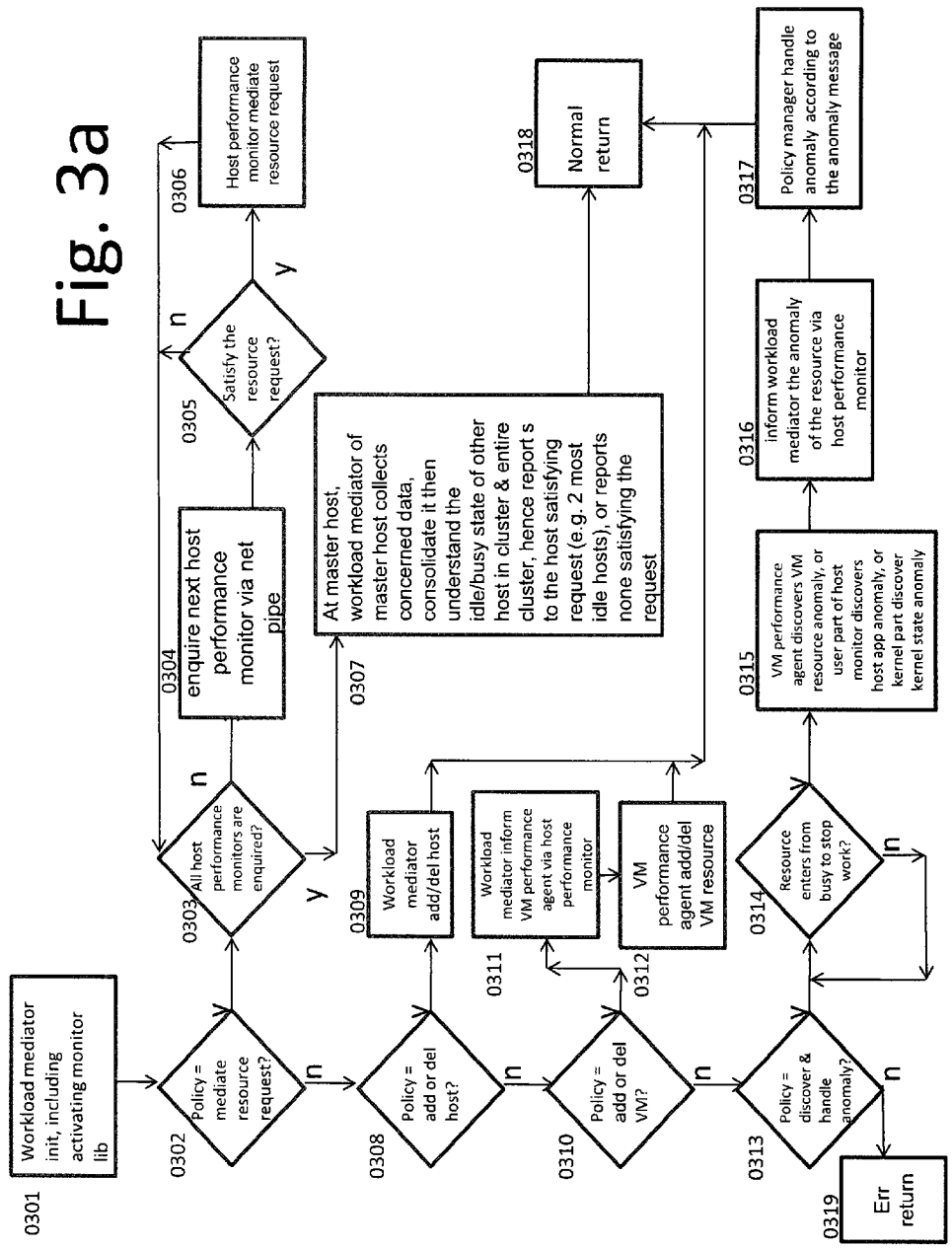
FIG. 3a the flowchart of the workload mediator in the framework to monitor performance of virtualized systems based on hardware base tool.

Refer to FIG. 3a, which shows the flowchart of workload mediator 1112.

In summary, workload mediator 1112 accepts policy request from policy manager 1111 via net pipe 13, collects resource performance data from the slave hosts 12 of the clusters in the virtualized systems, and executes the policy for the individual slave host 12 according to the performance of the entire clusters by consolidating the collected performance data, e.g. add/delete host, add/delete VM resource, or discover/handle anomaly.

The flow of workload mediator 1112 is as follows:

Step 301, workload mediator 1112 initializes itself, including activating monitoring library 1113. After monitoring library 1113 is activated, (1) workload mediator 1112 delivers in time the PMU event configuration information to monitoring library 1113, e.g. PMC event definition configuration and configuration of monitoring time length, as well as the information of resources to be collected; (2) Create monitors, monitored objects, and events as needed, according to the known configuration information from monitor library to configure PMU;

Step 302, determine if policy is to handle resource mediating request. If yes, proceed to step 303. Otherwise, proceed to step 308;

Step 303, determine if all the host performance monitor 1114 are enquired. If yes, proceed to step 304. Otherwise, proceed to step 307;

Step 304, enquire host performance monitor 1114 of the next host vianet pipe 13. Proceed to step 305;

Step 305, determine if the resource request can be satisfied. If yes, proceed to step 306. Otherwise proceed to step 303;

Step 306, host performance monitor 1114 handles the request to mediate resources. Proceed to step 303;

Step 307, the workload mediator 1112 at the master host 11 collects its concerned data. A data consolidation enables the understanding of the conditions of individual host and entire cluster of other clusters. Thus the satisfactory host is reported back (e.g. two most-idle hosts), or none of the host is reported. Proceed to step 318;

Step 308, determine if the policy is to add/delete host. If yes, proceed to step 309. Otherwise, proceed to step 310;

Step 309, workload mediator 1112 add/delete host. Proceed to step 318;

Step 310, determine if policy is add/delete VM resource. If yes, proceed to step 311. Otherwise, proceed to step 313;

Step 311, workload mediator 1112 informs VM performance agent 1 1211 via host performance monitor 1114. Proceed to step 312;

Step 312, VM performance agent 11211 adds/deletes VM resource. Proceed to step 318;

Step 313, determine if policy is to discover and handle anomaly. If yes, proceed to step 314. Otherwise, proceed to step 319;

Step 314, determine if some resource goes from busy to not-working state. If yes, proceed to step 315. Otherwise repeat step 314;

Step 315, VM performance agent 11211 discovers anomaly of VM resource, the user space portion of host performance monitor 1114 discovers anomaly of host application, or its kernel space portion discovers anomaly of kernel state. Proceed to step 316;

Step 316, inform workload mediator 1112 the abnormal condition of that resource via host performance monitor 1114. Proceed to step 317;

Step 317, policy manager 1111 handles anomaly according to the anomaly information. Proceed to step 318;

Step 318, normal return;

Step 319, error return.

Figure 3B:
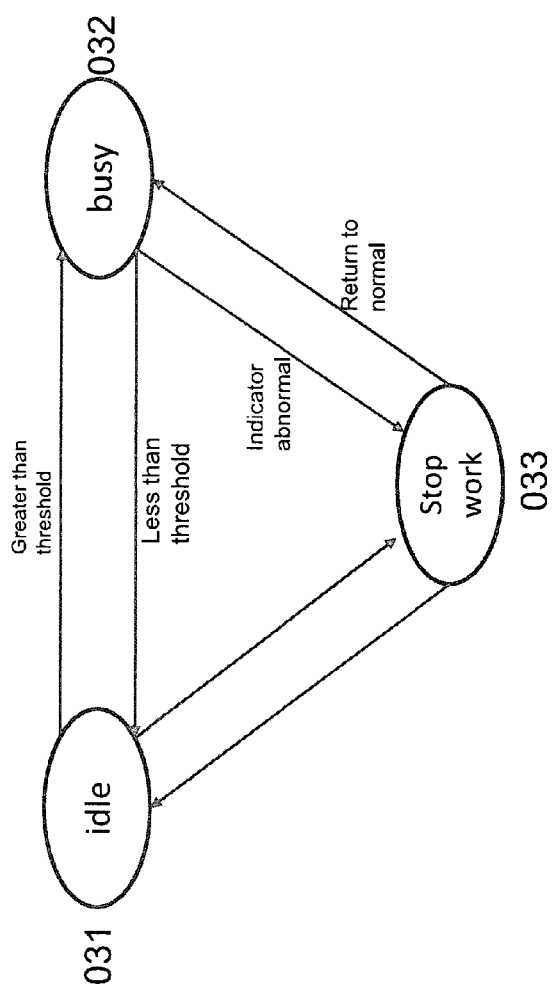
FIG. 3b the state diagram of the workload mediator in the framework to monitor performance of virtualized systems based on hardware base tool.

Refer to FIG. 3b, which shows the state diagram of workload mediator 1112.

The collected resource performance data by workload mediator 1112 are used to determine the idle/busy states of slave host 12, while the change of states also shows the anomaly and recovery health conditions. Workload mediator 1112 also consolidates the performance of entire cluster according to the collected performance data of individual slave hosts 12 of the cluster where the master host 11 resides. The host resource state includes: resource idle state 31, resource busy state 32 and resource not-working state 33.

If performance data is over threshold, then state changes from resource idle to resource busy; if performance data is below threshold, then state change from resource busy to resource idle; if state changes from resources busy to resource not-working, then there is anomaly; and if state changes from resource not-working to resource busy, then the resource returns to normal.

Figure 4:
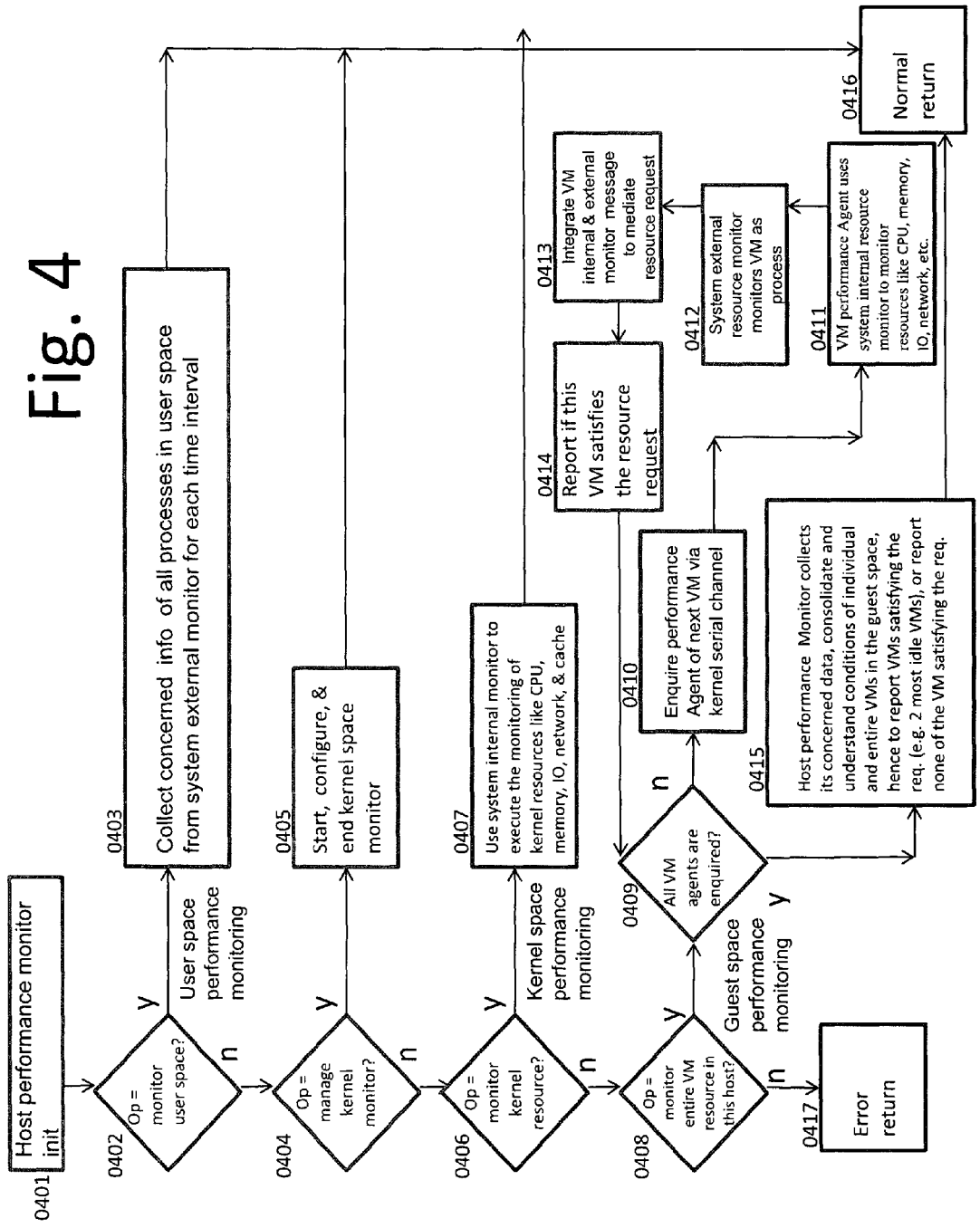
FIG. 4 the flowchart of the host performance monitor in the framework to monitor performance of virtualized systems based on hardware base tool.

Refer to FIG. 4, which shows the flowchart of host performance monitor 1114.

In summary, host performance monitor 1114 is responsible monitoring user space resources (i.e. application processes), guest space resources (VMs) and host kernel space resources. It also activates, configures, and stops host kernel space monitor 11142, wherein:

Monitor user space, meaning that monitoring performance information of all processes using system external resource monitor 105;

Monitor kernel space, including activating, configuring and stopping kernel space monitor 11142, and executing system internal resource monitor via system internal resource monitor 104;

Monitor user space, meaning that firstly, acquiring performance data from VM 1121, via Hypervisor-internal kernel serial port 1131, and the interaction amongst VM performance agents 11211 running at their individual VM 1121, thus VM performance agent 11211 monitoring VM resources via system internal resource monitor 104; secondly, monitoring VM 1121 from hypervisor via system external resource monitor 105, and acquiring process performance by taking that VM 1121 as a process, in order to match the acquire data from VM performance agent 11211, and to determine if VM 1121 satisfies performance request.

The flow of host performance monitor 1114 is as follows:

Step 401, host performance monitor 1114 initializes itself Proceed to step 402;

Step 402, if the operation is monitoring user space. If yes, proceed to step 403. Otherwise, proceed to step 404;

Step 0403, enter user space monitor 11141. Collect concerned performance information of all processes in the user space, from system external resource monitor 105 and at certain time interval. Proceed to step 416;

Step 404, determine if operation is to manage kernel space monitor 11142. If yes, proceed to step 405. Otherwise, proceed to step 406;

Step 405, activate, configure, and stop kernel space monitor 11142. Proceed to step 416;

Step 406, determine if operation is to monitor kernel space. If yes, proceed to step 407. Otherwise, proceed to step 408;

Step 407, execute monitoring internal resources like CPU, memory, IO, network, and cache using system internal resource monitor 104. Proceed to step 416;

Step 408, determine if operation is to monitor resources of all VMs 1121 of the current host. If yes, proceed to step 409. Otherwise, proceed to step 417;

Step 409, start entering kernel space monitor 11142. Determine if all VM performance agents 11211 are enquired. If yes, proceed to step 415. Otherwise, proceed to step 410;

Step 410, enquire next VM performance agent 11211 via kernel serial port 1131. Proceed to step 411;

Step 411, VM performance agent 11211 monitors resources like CPU, memory, IO, network, etc. with system internal resource monitor 104 Proceed to step 412;

Step 412, system external resource monitor 105 conduct monitoring by taking VM 1121 as process. Proceed to step 413;

Step 413, consolidate internal and external monitoring information of VM 1121 to mediate the resource request. Proceed to step 414;

Step 414, report if current VM 1121 satisfies the resource request. Proceed to step 409;

Step 415, host performance monitor 1114 collects its concerned data. After consolidating its data, it understands the condition of each individual VM 1121 in the guest space as well as the entire situation of VMs 1121 ($VM_1$ to $VM_n$), hence it is able to report VMs 1121 satisfying the request (e.g. 2 most idle VM 1121), or report no VM 1121 satisfying the request. Proceed to step 416;

Step 0416, normal return;

Step 0417, error return.

Refer to 5a, which shows the flowchart of system internal resource monitor 104.

The embodiment uses Linux OS system performance commands as examples, but the monitored Hypervisor OS may be any other OS, such as IBM AIX, z-OS or Oracle SunOS. System internal resource monitor 104 provides the performance data of CPU, memory, IO, network, and cache. It monitors host kernel space, while VM performance agent 11211 monitors the internal of VM 1121. Here is the difference a PMU makes: VM performance agent 11211 is unable to use kernel-level sampling and kernel-level event set for multiple events. This is because none-kernel-level monitoring consumes greater resources (e.g. more context switch), which impacts the accuracy of monitoring VM 1121.

System internal resource monitor 104 acquires data by soliciting two relative performance data and subtracting them at certain time interval, based on performance monitor base tool; The virtual resources that is monitored by system internal resource monitor 104, include: CPU resource, memory resource, IO resource, cache resource and network resource, wherein:

CPU resource comprises the total time of processes used by CPU to handle user space states, the total time of processes used by CPU to handle kernel space states, and total CPU idle time, total number of hard interrupts handled by CPU, and total number of soft interrupts handled by CPU, acquired by OS system performance commands;

Memory resource comprises information of total memory, free memory, shared memory and buffer memory acquired by OS system performance commands;

IO resource comprises the number of IO reads & writes of one or more processes, acquired by OS system performance commands;

Cache resource comprises data of cache, and TLB miss/hit acquired by said performance monitor base tool;

Network resource comprises network traffic data from network states acquired by OS system performance commands.

The flow of system internal resource monitor 104 is as follows:

Step 501, system internal resource monitor 104 initializes itself Proceed to step 502;

Step 502, determine if operation is to monitor CPU. If yes, proceed to step 503. Otherwise, proceed to step 506;

Step 503, set monitor begin time T1. Use cpu_usage_state to acquire the total number of processes used by CPU to handle user space states, the total time of processes used by CPU to handle kernel space states, and total CPU idle time, and total number of hard/soft interrupts handled by CPU. Proceed to step 504;

Step 504, determine if the monitoring end time T2 is reached. If yes, proceed to step 0505. Otherwise, repeat step 504;

Step 505, acquire the relative data of the monitor end time T2. Subtract the data at monitor begin time T1 from the data at monitor end time T2 to obtain the time of each processes consumed by CPU, the number of soft interrupts, and the number of hard interrupts during the time interval of monitor begin time T1→monitor end time T2. Proceed to step 518;

Step 506, determine if operation is to monitor memory. If yes, proceed to step 507. Otherwise, proceed to step 510;

Step 507, set monitor begin time T1. Acquire information of totalram, freeram, sharedram, bufferram, etc. for various memory, as well as information regarding process from sysinfo. Proceed to step 518;

Step 508, determine if the monitor end time T2 is reached. If yes, proceed to step 509. Otherwise, proceed to step 508;

Step 509, acquire the relative data of monitor end time T2. Subtract the data at monitor begin time T1 from the data at monitor end time T2 to get memory usage situation during the time interval of monitor begin time T1→monitor end time T2. Proceed to step 518;

Step 510, determine if the operation is to monitor IO. If yes, proceed to step 509. Otherwise, proceed to step 513;

Step 511, monitor IO. Proceed to step 512;

Step 512, collect the number of IO reads/writes of one or more processes at certain interval. Consolidate the data. Proceed to step 518;

Step 513, determine if operation is to monitor network. If yes, proceed to step 514. Otherwise, proceed to step 516;

Step 514, monitor network. Proceed to step 515;

Step 515, interpret the network traffic from TCPEXT of the Linux command netstat at certain time interval. Consolidate the data. Proceed to step 518;

Step 516, determine if operation is to monitor cache. If yes, proceed to step 0517. Otherwise, proceed to step 519;

Step 517, acquire the result of monitoring cache via PMU tool interface. Proceed to step 518;

Step 518, normal return;

Step 519, error return.

Figure 5A:
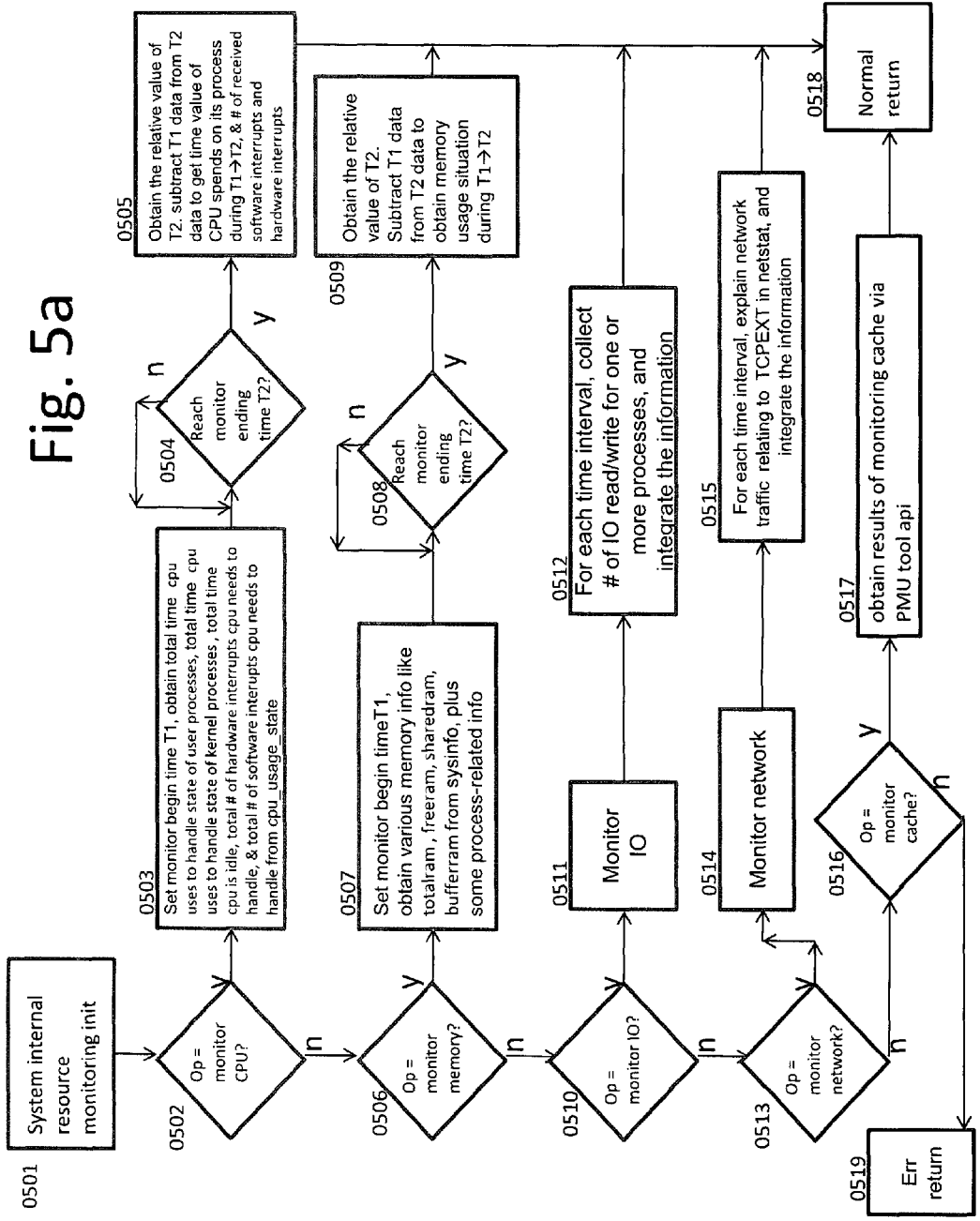
FIG. 5a the flowchart of the system internal resource monitor in the framework to monitor performance of virtualized systems based on hardware base tool.
Figure 5B:
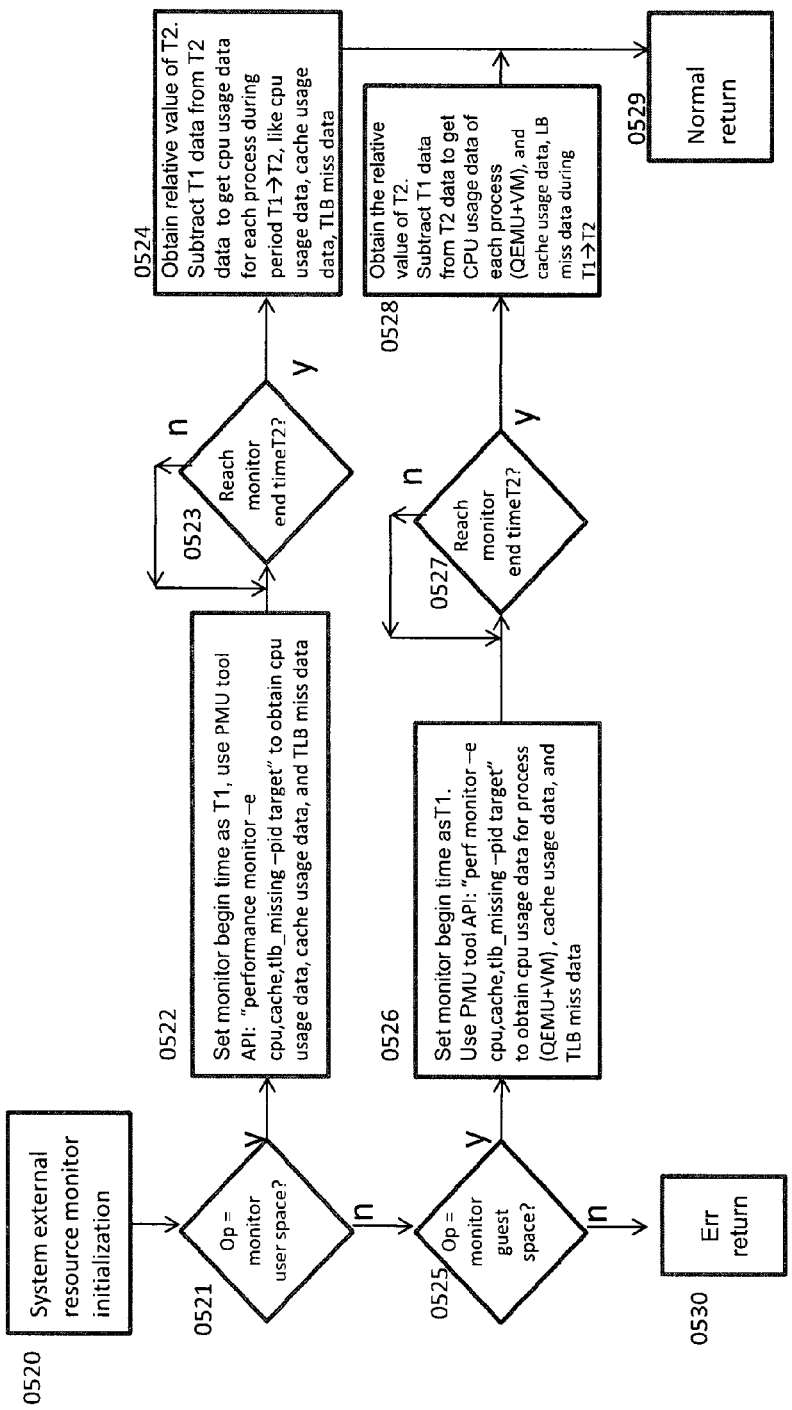
FIG. 5b the flowchart of the system external resource monitor in the framework to monitor performance of virtualized systems based on hardware base tool.

Refer to FIG. 5b, which shows the flowchart of system external resource monitor 105.

The embodiment uses Linux OS system performance commands as examples, but the monitored Hypervisor OS may be any other OS, such as IBM AIX, z-OS or Oracle SunOS. System external resource monitor 105 provides performance data of user space and guest space; specifically it provides:

(1) Host user space monitoring primarily monitors the processes running in the host user space. For example, the PMU base tool helps to acquire for each process, the CPU usage data, cache usage data, and TLB miss data.

(2) Monitoring of guest space means monitoring from external when taking VM as a process. For example, QEMU is an emulator for Hypervisor. QEMU uses software to emulate various CPU main boards (e.g. x86 Mainstone). Therefore, some OS virtualization technique is to run VM code on top of QEMU emulator, while QEMU is also a process running on Linux. So here are the guest-space monitoring activities: Monitor all processes of (QEMU+VM), acquire CPU usage data for processes in the user space, buffer the usage data and TLB miss data, and observe if VM CPU usage data is over said threshold so as to control CPU usage for that VM with other OS commands. This is the monitoring of the guest space.

It seems simple to monitor VM from the above description, but not so for virtualization technique such as Linux KVM, where the running of QEMU involves mode switch between user space and kernel space, hence the required accuracy of monitoring data is more complex. For PMU to monitor VM from external, kernel level sampling and kernel level event set can still be used. When performance data of VM running is over some threshold of CPU percentage, the Linux command cgroup can still be used to restrict the running of that VM, thus can remedy the deficiency that a VM agent cannot see the global condition from internal.

System external resource monitor 105 acquires data by soliciting two relative performance data and subtracting them at certain time interval, based on performance monitor base tool; the flow of system external resource monitor 105 is as follows:

Step 520, system external resource monitor 105 initializes itself. Proceed to step 521;

Step 521, determine if operation is monitoring user space. If yes, proceed to step 522. Otherwise, proceed to step 525;

Step 522, set monitoring begin time T1. Apply PMU tool API (application interface): "perf monitor-e cpu,cache,tlb_missing-pid target" to obtain CPU usage data, cache usage data, and TLB miss data for a process. Proceed to step 523;

Step 523, determine if the monitoring end time T2 is reached. If yes, proceed to step 524. Otherwise, repeat step 523;

Step 524, acquire the relative data for monitoring end time T2. Subtract the data at monitor begin time T1 from the data at monitor end time T2 to get CPU usage data, cache usage data and TLB miss data for each process during the interval monitoring begin time T1→monitoring end time T2. Proceed to step 529;

Step 525, determine if the operation is to monitor guest space. If yes, proceed to step 0526. Otherwise proceed to step 0530;

Step 0526, set monitoring begin time T1. Apply PMU tool API: "perf monitor-e cpu,cache,tlb_missing-pid target" to get CPU usage data, cache usage data and TLB miss data of process (QEMU+VM). Proceed to step 527;

Step 527, determine if the monitor end time T2 is reached. If yes, proceed to step 528. Otherwise, repeat step 527;

Step 528, acquire the relative data at the monitor end time T2. Subtract the data at monitor begin time T1 from the data at monitor end time T2 to get CPU usage data, cache usage data and TLB miss data of process (QEMU+VM) during the time interval from monitor begin time T1→monitor end time T2;

Step 529, normal return;

Step 530, error return.

Here is the description of bottom layer architecture: Bottom layer is implemented only at single host. The bottom layer is an object-oriented hierarchy where "ancestor" is "monitor library", and its descendants inherit from it, in the order of monitor, host performance monitor, system internal/external resource monitor. Monitor is also a collection class comprising at least on monitored object, and a monitored object comprising at least one event. An event acquires resource performance data from the performance monitor base tool based on event to sample or based on time to sample. It used the following 6 method to monitor: monitor based on single event, monitor based on n types of events, monitor based on event probability, monitor based on the number of events during certain time interval, monitor based on n types of events, and monitor based on resource utilization. Therefore, the details of an event are another important feature of the disclosed invention.

Figure 6:
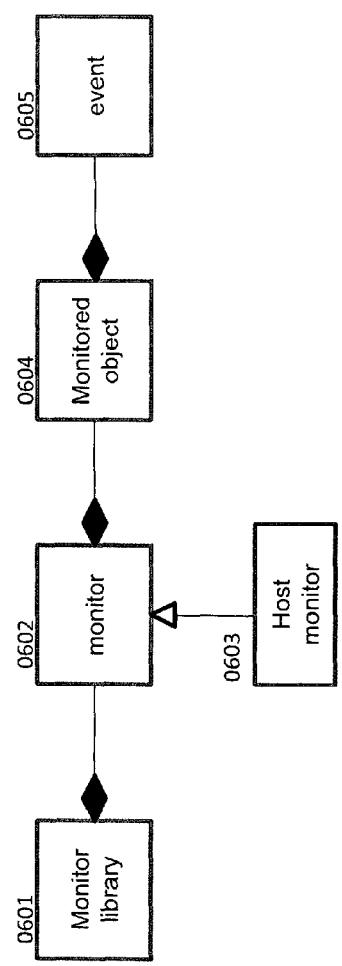
FIG. 6 the lower layer class diagram of the framework to monitor performance of virtualized systems based on hardware base tool.

Refer to FIG. 6, which shows the bottom layer class diagram, or the object-oriented engineering class diagram for monitor library and its inherited components. Specifically, monitor library 1113, its inherited components and the host performance monitor 1114 in master host 11 form a bottom layer, wherein:

Monitor library 1113 is the top layer class, and its inherited components are monitors 602;

Monitor 602 is the most important class. It is the base class for all other monitors, and is inherited by host performance monitor 1114 (expressed by ◁——, where the end near ◁ is inherited class, and the other end is inheriting class);

Each monitor 602 is a set of at least one monitored object 604, expressed by ♦——, where the end near ♦ is a set, and the other end is a member of the set);

Each monitored object 604 is a set of at least on event 605, meaning it contains one or more events 605;

Each event 605 means an atom monitoring event.

From the above description, monitor 602 may be an abstract concept of a monitoring function, and all inherited classes like host performance monitor 1114, VM performance agent 11211, etc. have more or less the same function to monitor resource performance. Monitor 602 is also a set, containing at least one member of the set.

Figure 7:
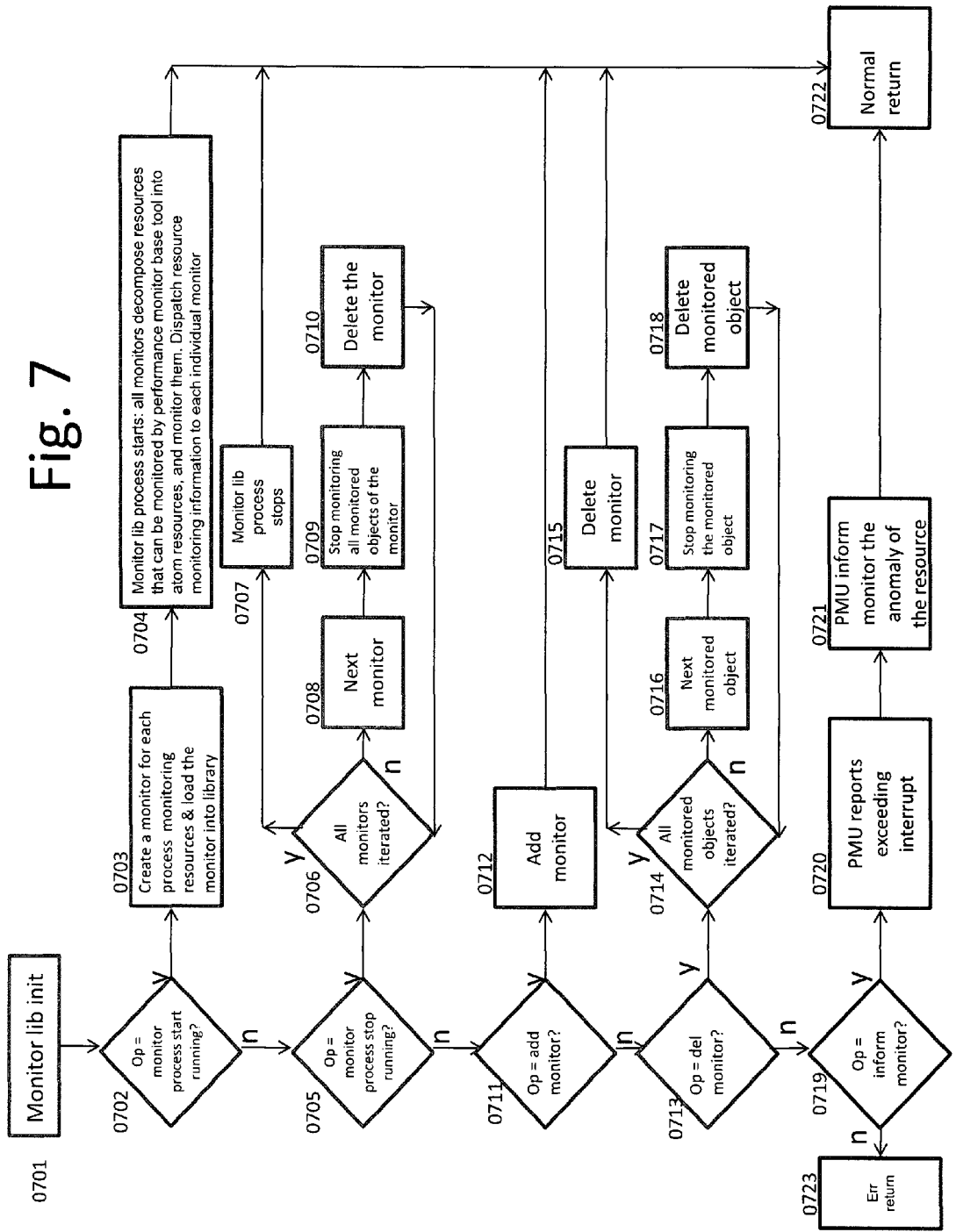
FIG. 7 the flowchart of the monitor library in the framework to monitor performance of virtualized systems based on hardware base tool.

Refer to FIG. 7, which shows a flowchart of monitor library 1113.

In summary, monitor library 1113 is responsible for activating all monitor processes, creating a monitor 602 for all processes monitoring resources, and loading monitor 602 to the monitor library 1113. When monitor library 1113 process starts, it decomposes the resources that can be monitored by the performance monitor base tool into atom resources that can be monitored for all monitor 602, monitors them, and dispatches resource monitoring information to each individual monitor 602. Monitor library 1113 is also responsible to stop all monitor processes, or delete all monitor 602, or activate individual monitor 602, or delete individual monitor 602. When the performance monitor base tool (i.e. PMU) discovers an overflow of CPU interrupts, PMU reports the anomaly to monitor 602.

The flow of monitor library 1113 is as follows:

Step 701, monitor library 1113 initializes itself. Proceed to step 702;

Step 702, determine if operation is to monitor process starts running. If yes, proceed to step 703. Otherwise, proceed to step 705;

Step 703, create a monitor 602 for all processes monitoring resources and load the monitor in library. Proceed to step 704;

Step 704, monitor library 1113 process starts: all monitors 602 decompose resources that can be monitored by performance monitor base tool into atom resources, and monitor them. Dispatch resource monitoring information to each individual monitor. Proceed to step 722;

Step 705, determine if operation is to monitor process stop running. If yes, proceed to step 706. Otherwise, proceed to step 711;

Step 706, determine if all monitors 602 are iterated. If yes, proceed to step 707. Otherwise, proceed to step 708;

Step 707, monitor library 1113 process stops. Proceed to step 722;

Step 708, enter next monitor 602. Proceed to step 709;

Step 709, end monitoring all monitored object 604 by the monitor 602. Proceed to step 710;

Step 710, delete monitor 602. Proceed to step 706;

Step 711, determine if operation is add monitor. If yes, proceed to step 712. Otherwise, proceed to step 713;

Step 712, add monitor 602. Proceed to step 722;

Step 713, determine if operation is to delete monitor 602. If yes, proceed to step 714. Otherwise, proceed to step 719;

Step 714, determine if all monitored object 604 are iterated. If yes, proceed to step 715. Otherwise, proceed to step 716;

Step 715, delete monitor 602. Proceed to step 722;

Step 716, enter next monitored object 604. Proceed to step 717;

Step 717, stop the monitored object 604. Proceed to step 718;

Step 718, delete the monitored object 604. Proceed to step 714;

Step 719, determine if operation is to inform monitor 602. If yes, proceed to step 720. Otherwise, proceed to step 723;

Step 720, PMU reports exceeding interrupt. Proceed to step 721;

Step 721, PMU informs monitor 602 the anomaly of the resource. Proceed to step 722;

Step 722, normal return;

Step 723, error return.

Figure 8:
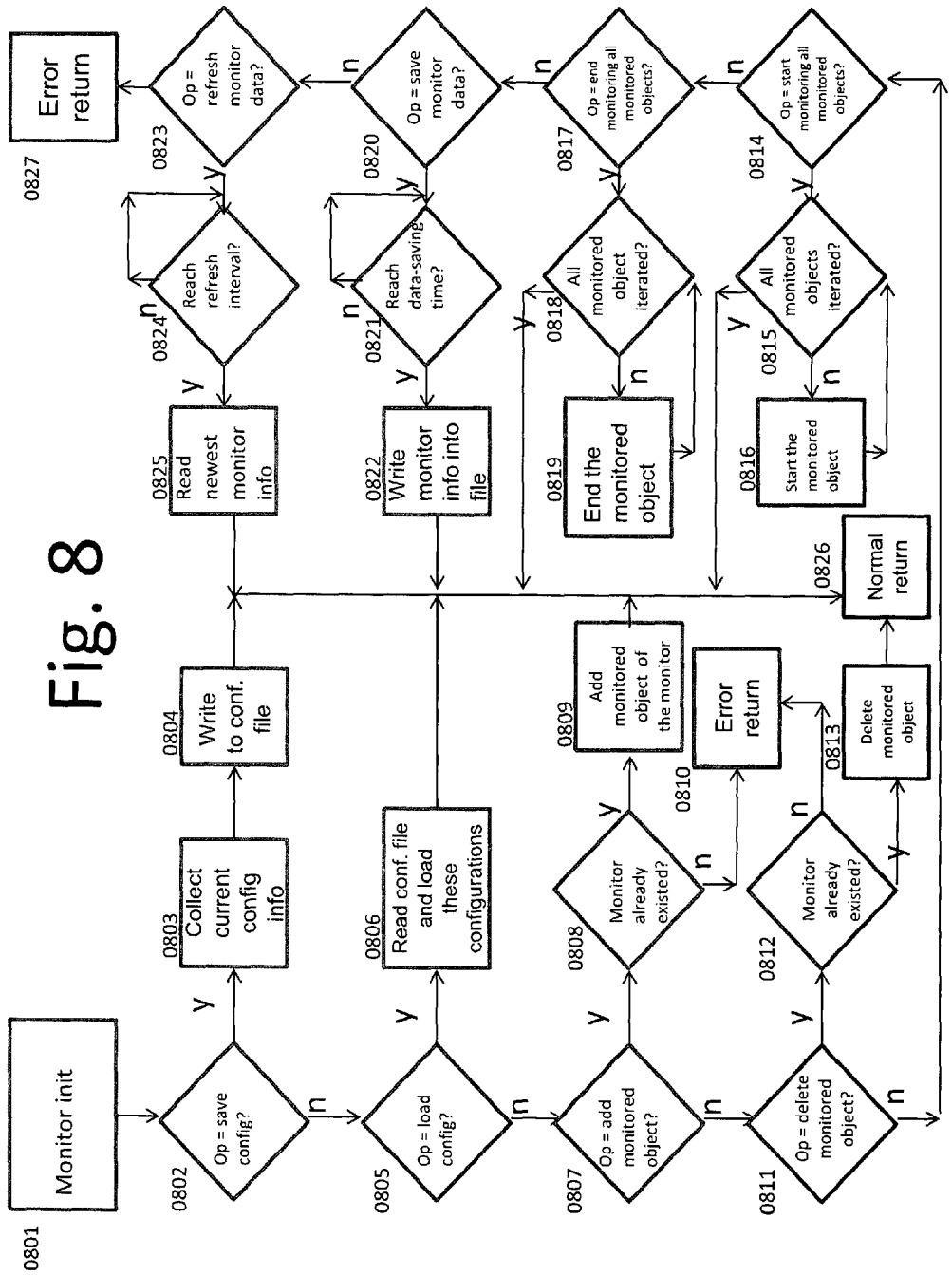
FIG. 8 the flowchart of the monitor in the framework to monitor performance of virtualized systems based on hardware base tool.

Refer to FIG. 8, which shows the flowchart of monitor 602.

In summary, monitor 602 is an abstract concept, has multiple basic monitoring function, and is suited for host performance monitor 1114, VM performance agent 11211, user space monitor 11141, and kernel space monitor 11142. The basic functions comprise save configuration, load configuration, add monitored object 604 of monitor 602, delete monitored object 604 of monitor 602, start monitoring all monitored objects 604, end monitoring all monitored objects 604, save monitoring data and refresh monitoring data.

The flow of monitor 602 is as follows:

Step 801, monitor 602 initializes itself. Proceed to step 802;

Step 802, determine if operation is to save configuration. If yes, proceed to step 803. Otherwise, proceed to step 805;

Step 803, collect current configuration message. Proceed to step 804;

Step 804, write to configuration file. Proceed to step 826;

Step 805, determine if operation is to load configuration. If yes, proceed to step 0806. Otherwise, proceed to step 807;

Step 806, read configuration file and load the configurations. Proceed to step 826;

Step 807, determine if operation is to add monitored object 604 of the monitor 602. If yes, proceed to step 808. Otherwise, proceed to step 811;

Step 808, determine if monitor 602 already existed. If yes, proceed to step 809. Otherwise, proceed to step 810;

Step 809, add the monitored object of the monitor 602. Proceed to step 826;

Step 810, error return;

Step 811, determine if operation is delete monitored object 604 of the monitor 602. If yes, proceed to step 812. Otherwise, proceed to step 814;

Step 812, determine if monitor 602 already existed. If yes, proceed to step 813. Otherwise, proceed to step 810;

Step 813, delete monitored object 604. Proceed to step 826;

Step 814, determine if operation is to start monitoring all monitored objects 604. If yes, proceed to step 815. Otherwise, proceed to step 817;

Step 815, determine if all monitored objects 604 are iterated. If yes, proceed to step 826. Otherwise, proceed to step 816;

Step 816, start the monitored object 604. Proceed to step 815;

Step 817, determine if operation is to stop monitoring all monitored objects 604. If yes, proceed to step 818. Otherwise, proceed to step 820;

Step 818, determine if all monitored objects 604 are iterated. If yes, proceed to step 826. Otherwise, proceed to step 819;

Step 819, stop the monitored object 604. Proceed to step 818;

Step 820, determine if operation is to save monitoring data. If yes, proceed to step 821. Otherwise, proceed to step 823;

Step 821, determine if the time to save data is reached. If yes, proceed to step 822. Otherwise, repeat step 821;

Step 822, write the monitoring information to file. Proceed to step 826;

Step 823, determine if operation is to refresh new monitoring data. If yes, proceed to step 824. Otherwise proceed to step 827;

Step 824, determine if refresh interval is reached. If yes, proceed to step 825. Otherwise, repeat step 824;

Step 825, read the newest monitor information. Proceed to step 826;

Step 826, normal return;

Step 827, error return.

Figure 9:
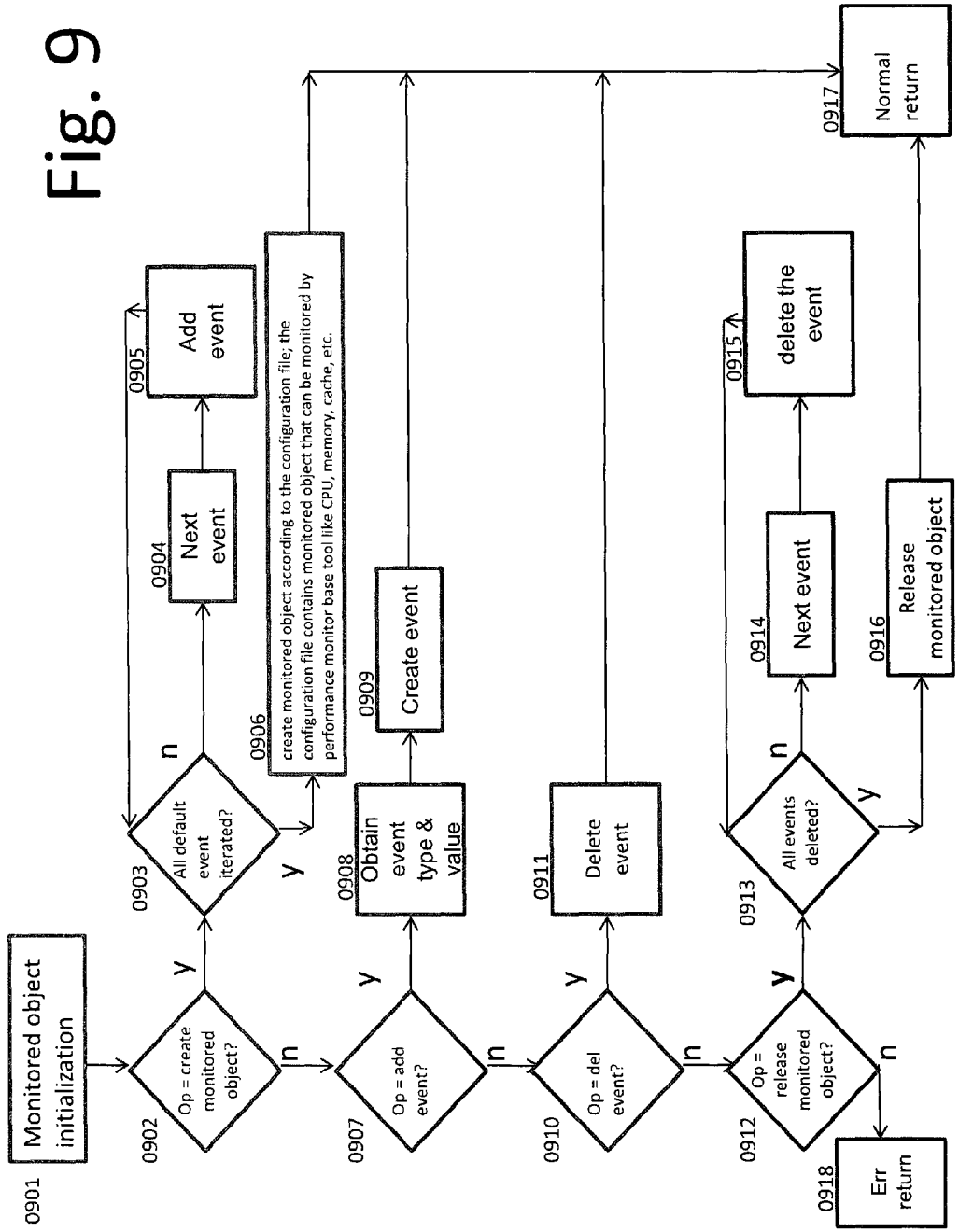
FIG. 9 the flowchart of the monitored object in the framework to monitor performance of virtualized systems based on hardware base tool.
Figure 10:
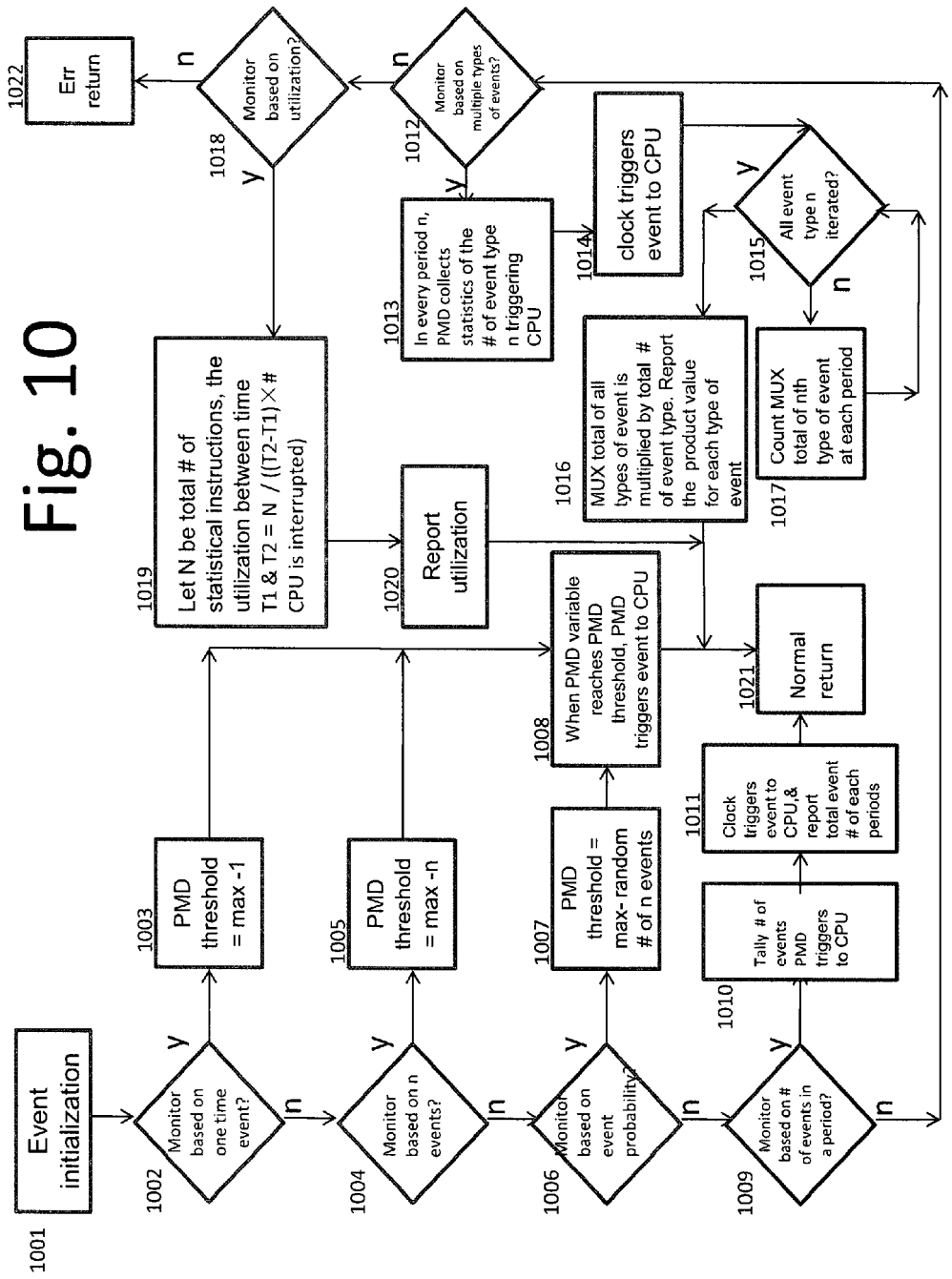
FIG. 10 the flowchart of the event executor in the framework to monitor performance of virtualized systems based on hardware base tool.

Refer to FIG. 9, which shows the flowchart of monitored object 604.

In summary, the most important basic function of a monitored object 604 is to create monitored object 604. Create monitored object 604 according to the configurations in the configuration file. The configuration file contains the objects that can be monitored by performance monitor base tool. Examples are CPU, memory and cache, etc. The other basic functions of monitored object 604 are to add monitored object 604, delete monitored object 604 and release monitored object 604.

The flow of monitored object 604 is as follows:

Step 901, monitored object 604 initializes itself. Proceed to step 902;

Step 902, determine if operation is to create monitored object 604. If yes, proceed to step 903. Otherwise, proceed to step 0907;

Step 903, determine if all default events 605 are iterated. If yes, proceed to step 904. Otherwise, proceed to step 906;

Step 904, enter next event 605. Proceed to step 905;

Step 905, add event 605. Proceed to step 903;

Step 906, create monitored object 604 according to the configurations in the configuration file. The configuration file contains objects that can be monitored by performance monitor base tool. Examples are CPU, memory, cache, etc. Proceed to step 917;

Step 907, determine if operation is to add event 605. If yes, proceed to step 908. Otherwise, proceed to step 910;

Step 908, obtain type and value of event 605. Proceed to step 909;

Step 909, create event 605. Proceed to step 917;

Step 910, determine if operation is to delete event 605. If yes, proceed to step 911. Otherwise, proceed to step 912;

Step 911, delete event 605. Proceed to step 917;

Step 912, determine if operation is to release monitored objects 604. If yes, proceed to step 913. Otherwise, proceed to step 918;

Step 913, determine if all events 605 are deleted. If yes, proceed to step 916. Otherwise, proceed to step 914;

Step 914, enter next event 605. Proceed to step 915;

Step 915, delete event 605. Proceed to step 913;

Step 916, release monitored object 604. Proceed to step 917;

Step 917, normal return;

Step 918, error return.

Refer to 10, which shows the flowchart of event 605.

In summary, monitor 602 uses 6 methods based on event 605 or based on time:

(1) base on a single event 605: set the PMD threshold as maximum value minus 1. If the threshold is reached, trigger monitor 602 to report.

(2) based on n times of events 605: set the PMD threshold as maximum value minus n, where n is a nature number greater than 1. If the threshold is reached, trigger monitor 602 to report.

(3) based on event 605 probability: set the PMD threshold as maximum value minus a random number of n events. If the threshold is reached, trigger monitor 602 to report.

(4) based on the number of events within certain time: accumulate the event number of triggering CPU until the clock reach certain specific time interval, and report the total number of events at various time intervals.

(5) based on multiple types of event 605 (assume there exist n types of events): accumulate the number of type 1 event in interval 1, . . . , accumulate the number of type n event in interval n, accumulate the number of type n+1 event in interval n+1, . . . , accumulate the number of type 2n event in interval n, accumulate the number of type 1 event in interval (m−1)×n+1, . . . , accumulate the number of type n event in interval m×n, until interval m×n reach the tally time. Then multiply n to the number total at individual time interval for event type 1, . . . , multiply n to the number total at individual time interval for event type n. Finally, report the resulted number for each type of events.

(6) based on resource utilization: Let N be total # of statistical instructions, report the utilization between time T1 and T2=N/((T2−T1)×total number CPU is interrupted).

The flow of event 605 is as follows:

Step 1001, event 605 initializes itself. Proceed to step 1002;

Step 1002, determine if operation is to monitor based on single event 605. If yes, proceed to step 1003. Otherwise, proceed to step 1004;

Step 1003, PMD threshold=MAX−1. Proceed to step 1008;

Step 1004, determine if operation is to monitor based on n events 605. If yes, proceed to step 1005. Otherwise, proceed to step 1006;

Step 1005, PMD threshold=MAX−n. Proceed to step 1008;

Step 1006, determine if operation is to monitor based on the probability of event 605. If yes, proceed to step 1007. Otherwise, proceed to step 1009;

Step 1007, PMD threshold=MAX−random number of n events. Proceed to step 1008;

Step 1008, when PMD variable reaches PMD threshold, PMD triggers CPU to generate event 605. Proceed to step 1021;

Step 1009, determine if operation is to monitor based on the number of events at some time interval. If yes, proceed to step 1010. Otherwise, proceed to step 1012;

Step 1010, tally the number of events when PMD triggers CPU. Proceed to step 1011;

Step 1011, clock triggers CPU to generate event 605, report the total number of events at individual time intervals. Proceed to step 1021;

Step 1012, determine if operation is to monitor based on multiple types of events 605. If yes, proceed to step 1013. Otherwise, proceed to step 1018;

Step 1013, PMD tallies the number of event 605 trigger CPU at the time interval n. Proceed to step 1014;

Step 1014, clock trigger CPU to generate event 605. Proceed to step 1015;

Step 1015, determine if all type n event 605 are iterated. If yes, proceed to step 1016. Otherwise, proceed to step 1017;

Step 1016, the MUX total of each individual event 605 is multiplied by total number of event type. Report for each type of event 605 the result that is multiplied by total number of event type. Proceed to step 1021;

Step 1017, count MUX total of $n^{th}$ type of event at each time interval. Proceed to step 1015;

Step 1018, determine if operation is to monitor based on utilization. If yes, proceed to step 1019. Otherwise, proceed to step 1022;

Step 1019, Let N be total # of statistical instructions, report the utilization between time T1 and T2=N/((T2−T1)×total number CPU is interrupted). Proceed to step 1020;

Step 1020, report utilization. Proceed to step 1021;

Step 1021, normal return;

Step 1022, error return.

In a practical implementation environment, the performance monitor for virtualized systems of the disclosed invention is not restricted to any commercial hypervisor, which may be TVM from Transoft (shanghai), Inc., Xen from Citrix, or ESX from VMWare, etc. The guest OS may be Windows, Linux, Android, or other cell phone OS. In addition, although the performance monitor method of this disclosed invention in many embodiments uses performance monitoring base tool of PMU running on x86 architecture, the method covers other x86 or none-x86 (e.g. IBM and Oracle) monitoring tools.

According to the above flow description, the said method of performance monitoring for virtualized systems provides techniques of resource performance monitoring for enterprise private cloud. On one hand, the technique is based on hardware to provide performance and event data such that administrators are able to understand the idle/busy conditions of entire virtualized systems and mediates workload, or the upper layer applications are able to call API of the method to realize automation of workload mediation. On the other hand, the cloud provider of public cloud may also use the sais administrator manual means and application automatic means to take advantage of the disclosed invention, with no restriction of multi-tenant or multi-data centers of large geographical network architecture (e.g. distributed or centralized federations).

Therefore, the disclosed invention combines performance monitoring base tool based on hardware and VM performance agents running of various servers as well as host performance monitors, to provide a framework and method of performance monitoring for virtualized systems. The disclosed invention is able to monitor VM performance, sample data based on events, time or mix of both, to realize a new performance monitoring method for virtualized systems.

The embodiments and their illustrative diagrams describe in details for the disclosed invention. Those skilled in the art may make various modified examples according to the description. Therefore, the details of the embodiments do not limit the invention. The disclosed invention takes the defined coverage by attached claims to be its protected scope.

What is claimed is:

1. A framework based on hardware base tool monitoring the performance of virtualized systems, wherein the said framework comprises at least one master host, and each master host comprises user space components, guest space components, kernel space components and hardware, wherein, the user space components comprising a policy manager, a workload mediator, a monitor library and a host performance monitor connected successively, the host performance monitor also connected to the workload mediator, and the host performance monitor comprising a user space monitor and a kernel space monitor;

the guest space components comprising at least one virtual machine (VM) connected to the host performance monitor via a kernel serial port, and the VM comprising a VM performance agent for collecting performance data of VM resources;

the kernel space components comprising performance monitoring base tool application interface (API) and performance monitoring base tool core code module connected successively to the monitor library, as well as a task scheduler, a memory management unit, a network driver, a file system, and a device driver, and the network driver being connected to the workload mediator;

the hardware being for supporting a peripheral performance monitor base tool, the hardware comprising a PMU connected to the performance monitoring base tool core code module, PMD and PMC connected to the PMU respectively, as well as a CPU, a memory, a network card, and a hard disk, and said the network card being connected to the network driver.

2. The framework as claim 1, wherein the said framework further comprises at least one slave host, the master host being connected to the said at least one slave host via a net pipe to form a cluster, multiple master hosts and their respective slave hosts forming multiple clusters, one of the clusters communicating with other clusters in centralized, distributed or mixed communications style, the slave host comprising the host performance monitor, and the host performance monitor of the slave host being connected to the network card in the master host.

3. The framework as claim 1, wherein the virtualized systems comprise an in-system resource monitor and an out-of-system resource monitor, the policy manager, the workload mediator and the host performance monitor of the said master host forming as upper-layer architecture, wherein each policy manager is a set of at least one workload mediator, each workload mediator is a set of at least one host performance monitor, each host performance monitor is a set of at least one said VM performance agent a set of the user space monitor and the kernel space monitor, and the host performance monitor being inherited respectively by the in-system resource monitor and the out-of-system resource monitor.

4. The framework as claim 3, wherein the said policy manager is used to interpret user policy requests, specify the conditions to be reached for CPU, memory, network, IO, and cache, and divide the user policy requests into high, median, and low levels, when the master host of the cluser can not satisfy the user policy requests, the said policy manager enquiring the policy manager of the master host of other clusters simultaneously or in a prioritized order according to the cluster policy enquired, so as to satisfy the user policy requests.

5. The framework as claim 3, wherein, the workload mediator in the said master host acquires policy requests from the said policy manager, collecting resource performance data of individual slave hosts in the same cluster where the master host resides via the said net pipe, consolidating to get performance of the entire cluster according to the said performance data, and being responsible for executing policy to the resources of individual slave hosts; and the performance data collected by the said workload mediator is used to determine the idle/busy state of the said slave host resources, the state transiting from resource idle to resource busy if the said performance data is over a preset threshold, the state transiting from resource busy to resource idle if the said performance data is lower than the said preset threshold, if the state transits from resource busy to resource not-working, there being anomaly, if the state transits from resource not-working to resource busy, the resource returning to normal.

6. The framework as claim 3, wherein the said host performance monitor is used to monitor a user space, a kernel space and a guest space, wherein monitoring the user space means monitoring performance information of all processes in the user space using the said out-of-system resource monitor;

monitoring the kernel space means activating, configuring, and stopping the said kernel space monitor, as well as monitoring in-system resources via the said in-system resource monitor;

monitoring the guest space means (1) interacting with the said VM performance agent running at individual VM via the said kernel serial port, acquiring data from the said VM, and the said VM performance agent monitoring virtual resources via the said in-system resource monitor; (2) monitoring VM via the said out-of system resource monitor, the VM being regarded as a process and acquiring performance of the process, and determining if the said VM satisfies performance requests to match the acquired data by the said VM performance agent.

7. The framework as claim 6, wherein the said in-system resource monitor acquires data by soliciting two relative performance data and subtracting them at a certain time interval based on the performance monitoring base tool, the resources monitored by the said in-system resource monitor comprising CPU resources, memory resources, IO resources, cache resources and network resources, wherein, the CPU resources comprising total time of processes used by CPU to handle user-space state, total time of processes used by CPU to handle kernel-space state, total CPU idle time, total number of hard interrupts handled by CPU, and total number of soft interrupts handled by CPU, which is acquired through OS performance commands;

the memory resources comprising all memory, free memory, shared memory, and buffer memory obtained through OS performance commands;

the IO resources comprising number of reading and writing of one or more processes obtained through OS performance commands;

the cache resources comprising the data of cache, TLB miss and hit obtained through said performance monitoring base tool; and the network resources comprising network traffic of the network state obtained through OS performance commands.

8. The framework as claim 6, wherein the said out-of system resource monitor acquires data by soliciting two relative performance data and subtracting them at a certain time interval based on the performance monitoring base tool and the spaces monitored by the said out-of-system resource monitor comprise the user space and the guest space, wherein:

monitoring the user space comprising acquiring CPU usage data, cache usage data and TLB miss data in the user space via OS performance commands;

monitoring the guest space comprises acquiring CPU usage data, cache usage data and TLB miss data of the said processes in the user space via OS performance commands, and observing whether the CPU running data of the said VM being over threshold, so as to control the CPU occupancy factor of the VM via other OS commands.

9. The framework as claim 2, wherein the framework further comprises inherited components of the said monitor library, and the monitor library, inherited components of the monitor library, and the said host performance monitor in the said master host form a bottom-layer architecture, wherein the said monitor is the top-layer class while its inherited components is monitor, the said monitor being inherited by the host performance monitor, the host performance monitor being respectively inherited by the said kernel-space monitor, the user-space monitor, and the VM performance agent, each of the said monitor being a set of at least one monitored object, each of the said monitored object being a set of at least one event, and each of the said event representing one atom monitoring event.

10. The framework as claim 9, wherein the said monitor library creates a monitor for all processes to monitor resources, and the monitor is loaded into the monitor library, when the said monitor library process starts, the resources capable of being monitored by the said performance monitoring base tool being decomposed into atom resources, proceeding to monitor the resources, and the resource monitored information being dispatched to individual said monitor, when the said performance monitoring base tool discovers CPU interrupt overflow, the anomaly is informed to the said monitor, and the said monitor library being used to add or delete monitors.

11. The framework as claim 9, wherein the said monitor is used to save configuration, load configuration, add/delete the said monitored object, start/stop the said monitored object, and refresh/save monitoring information.

12. The framework as claim 9, wherein the said monitored object is created according to the configuration information in a configuration file, and the configuration file comprises objects capable of being monitored by the said performance monitoring base tool.

13. The framework as claim 9, wherein, if the said performance monitoring base tool monitors based on one-time event, the threshold of the performance monitoring base tool=maximum value−1;

if the said performance monitoring base tool monitors based on n events, the threshold of the performance monitoring base tool=maximum value−n wherein n is a nature number greater than 1;

if the said performance monitoring base tool monitors based on event probability, the threshold of the performance monitoring base tool=maximum value−a random number of n events;

if the said performance monitoring base tool monitors based on the event number in a certain time interval, the number of CPU events triggered by the performance monitoring base tool is tallied, and when clock triggers CPU, the total number of events of individual time interval is reported;

if the said performance monitoring base tool monitors based on n types of events, the number of events triggered to CPU in each time interval i (i=1, ... n) is tallied by the performance monitoring base tool, and the reported result is the total number of same-type events of each time interval multiplying n; and if the said performance monitoring base tool monitors based on resource utilization, the utilization between time T1 and T2=N/((T2−T1)×number of interrupts of CPU), wherein N is the total number of commands.

14. A method based on the framework based on hardware base tool monitoring the performance of virtualized systems as claim 1, wherein the method comprises the following steps:

firstly, an administrator making performance mediation requests to the said policy manager via a graphical interface or an user application via the said performance monitor application interface;

secondly, after the said policy manager interprets the said performance mediation requests, the said workload mediator being instructed to report performance conditions of the resources of individual slave host to the said master host via the said network pipe; and finally, the said policy manager reporting the performance conditions to the said user application process or the administrator.

* * * * *